(12) United States Patent
Risse et al.

(10) Patent No.: US 7,514,054 B2
(45) Date of Patent: Apr. 7, 2009

(54) FLUE GAS PURIFICATION DEVICE HAVING AN ESSENTIALLY HORIZONTAL THROUGH FLOW

(75) Inventors: Theo Risse, Werne (DE); Christian Moser, Essen (DE)

(73) Assignee: Lentjes GmbH (DE)

( * ) Notice: Subject to any disclaimer, the term of this patent is extended or adjusted under 35 U.S.C. 154(b) by 359 days.

(21) Appl. No.: 11/287,060

(22) Filed: Nov. 23, 2005

(65) Prior Publication Data

US 2006/0210461 A1    Sep. 21, 2006

(30) Foreign Application Priority Data

Mar. 18, 2005   (EP)   ................... 05005921

(51) Int. Cl.
*B01D 53/34* (2006.01)
*B01D 53/74* (2006.01)
*B01D 53/78* (2006.01)
*B01D 53/50* (2006.01)

(52) U.S. Cl. ............... 423/210; 423/242.1; 423/243.01; 423/243.08; 423/DIG. 5; 422/105; 422/108; 422/111; 422/168; 422/176

(58) Field of Classification Search ................. 423/210, 423/242.1, 243.01, 243.08, DIG. 5; 422/105, 422/108, 111, 168, 176
See application file for complete search history.

(56) References Cited

U.S. PATENT DOCUMENTS

| | | | |
|---|---|---|---|
| 3,800,505 A | 4/1974 | Tarves, Jr. | |
| 3,948,608 A | 4/1976 | Weir, Jr. | |
| 4,374,813 A | 2/1983 | Chen et al. | |
| 4,400,355 A * | 8/1983 | Donnelly et al. | 422/170 |
| 4,539,184 A | 9/1985 | Stehning | |
| 4,606,867 A | 8/1986 | Eguchi | |
| 4,976,751 A | 12/1990 | Schippert | |
| 5,199,263 A | 4/1993 | Green et al. | |
| 5,362,464 A * | 11/1994 | Burgess et al. | 423/243.08 |
| 5,478,449 A * | 12/1995 | Hayakawa | 95/224 |
| 5,540,760 A | 7/1996 | Risse et al. | |
| 5,582,807 A * | 12/1996 | Liao et al. | 423/210 |
| 5,648,048 A | 7/1997 | Kuroda et al. | |
| 5,788,944 A | 8/1998 | Kikkawa et al. | |
| 5,826,518 A | 10/1998 | Bhat et al. | |
| 5,993,640 A | 11/1999 | Risse | |
| 6,132,692 A * | 10/2000 | Alix et al. | 423/210 |
| 6,180,012 B1 * | 1/2001 | Rongved | 210/717 |

(Continued)

FOREIGN PATENT DOCUMENTS

CA    1124037    5/1982

(Continued)

OTHER PUBLICATIONS

Communication from European Patent Office (with non-English abstract) regarding related application dated Dec. 14, 2005.

(Continued)

*Primary Examiner*—Timothy C Vanoy
(74) *Attorney, Agent, or Firm*—Harness, Dickey & Pierce, P.L.C.

(57) ABSTRACT

A flue gas purification device includes a receptacle, which has an absorption zone, through which the supplied glue gas can flow in an essentially horizontal direction.

9 Claims, 6 Drawing Sheets

U.S. PATENT DOCUMENTS

| | | |
|---|---|---|
| 2003/0089242 A1 | 5/2003 | Wakamatsu et al. |
| 2003/0116018 A1 | 6/2003 | Echizen et al. |

FOREIGN PATENT DOCUMENTS

| | | |
|---|---|---|
| CA | 1 251 919 | 4/1989 |
| CA | 2111183 | 9/1994 |
| CA | 2137364 | 10/1994 |
| CA | 2135430 | 11/1994 |
| CA | 2 493 769 | 2/2004 |
| DE | 43 29 427 C2 | 9/1993 |
| DE | 44 06 684 A1 | 3/1994 |
| DE | 195 39 084 A1 | 10/1995 |
| DE | 197 51 851 A1 | 11/1997 |
| DE | 100 58 548 C1 | 11/2000 |
| EP | 0162536 | 2/1985 |
| EP | 0363009 | 9/1989 |
| EP | 0945164 | 10/1997 |
| JP | 10-192646 | 7/1998 |
| JP | 2002-035545 | 2/2002 |
| KR | 10-0301564 | 6/2001 |
| KR | 10-2005-0007488 | 1/2005 |
| RU | 2 124 932 C1 | 1/1999 |
| WO | WO 03/082444 A1 | 10/2003 |
| WO | WO 2004/011127 A1 | 2/2004 |

OTHER PUBLICATIONS

Communication from European Patent Office regarding related application dated Dec. 2, 2005.

* cited by examiner

FLUE GAS PURIFICATION DEVICE HAVING AN ESSENTIALLY HORIZONTAL THROUGH FLOW

The present invention relates to a device and a method for purifying exhaust gas, in particular for purifying flue gas of a coal power station or the like.

Purification devices are already known. Normally they comprise a scrubbing column having scrubbing liquid nozzles, which are often arranged on several levels, a scrubbing liquid sump, in which scrubbing liquid is collected, and an absorption zone, which extends inside a cylindric receptacle of the scrubbing column from the scrubbing liquid sump towards the upper scrubbing liquid nozzle level. Flue gas is introduced into a lower section of the absorption zone in the scrubbing column, flows substantially vertically upwards from there and leaves the scrubbing column through an outlet provided above the scrubbing liquid nozzles. On its way through the scrubbing column, the flue gas gets into contact with scrubbing liquid emerging from the scrubbing liquid nozzles and is purified, which is described in the following. Such a purification device is for example known from DE-A-100 58 548.

The scrubbing liquid preferably contains, apart from water, alkaline earths, which react with the sulphur oxides present in the flue gas and the sulphur oxides generated in the scrubbing column. Lime in form of calcium oxide, calcium hydroxide, calcium carbonate or the like is in particular used.

The alkaline earths react with the sulphur oxides present in the flue gas essentially to calcium sulphite, which is bound in the scrubbing liquid. In this manner, the flue gas is purified from the undesirable sulphur oxides and flows out of the purification device afterwards. However, the scrubbing liquid containing the calcium sulphite particles, which are kept floating in this one, flows into the scrubbing liquid sump and is collected there.

Calcium sulphate, which is generated during the flue gas purification, has similar positive properties as natural gypsum. It is thus a desired by-product of the flue gas purification process, which is won from the scrubbing liquid collected in the scrubbing liquid sump. The calcium sulphate particles are removed together with the scrubbing liquid from the scrubbing liquid sump and are then extracted from the scrubbing liquid in a subsequent process. The calcium sulphate can then be further processed to materials, in particular construction materials.

A problem in the winning of calcium sulphate finally is that not only calcium sulphate is generated by the reaction of the scrubbing liquid with the flue gas, but also undesirable by-products, such as for example sulphites, in particular calcium sulphite, which render the calcium sulphate impure and thus worsen the quality.

In order to reduce the portion of these undesirable sulphites in the scrubbing liquid present in the scrubbing liquid sump, it is proposed in U.S. Pat. No. 4,539,184 to introduce oxygen in form of air or the like into at least one zone of the scrubbing liquid sump, in order to oxidize calcium sulphites, which are present there, to calcium sulphate.

For winning calcium sulphate of good quality it has to be taken care that as few alkaline earths as possible are contained in the scrubbing liquid collected in the scrubbing liquid sump, when the scrubbing liquid is removed from the scrubbing liquid sump for winning calcium sulphate.

Accordingly, nearly all alkaline earths admixed to the scrubbing liquid should react with the sulphur oxides contained in the flue gas to be purified during the flue gas purification process.

Such a complete reaction of the alkaline earths can be obtained by different measures, which can also be carried out together.

On the one hand, one can strive for an improved reaction between the reaction partners in order to increase the probability of a corresponding reaction.

The reaction of alkaline earths and sulphur oxides to calcium sulphite is realized by diffusion and/or solution at the contact surface between scrubbing liquid and flue gas. Thus, the larger the contact surface is, the better will be the achieved reaction. The contact surface is conversely proportional to the size or diameter of the scrubbing liquid droplets, which leave the scrubbing liquid nozzles. Accordingly, it is proposed in CA-A-1 251 919 to atomize the scrubbing liquid as finely as possible by means of the scrubbing liquid nozzles, in order to reduce the size of the scrubbing liquid droplets in this way and correspondingly to increase the total contact surface between scrubbing liquid and the flue gas to be purified.

A better reaction of the alkaline earths during the flue gas purification process can also be achieved in that the residence time of the scrubbing liquid in the absorption zone of the scrubbing column is prolonged, in order to give the alkaline earths enough opportunity to react with sulphur oxides in the flue gas. In this way, the probability is increased that every alkaline earth particle participates in such a reaction. For increasing the residence time of the scrubbing liquid in the absorption zone of the scrubbing column, CA-A-1 252 919 for example proposes to make the scrubbing liquid circulate several times between scrubbing liquid sump and scrubbing liquid nozzles, such that this one passes more often through the absorption zone of the scrubbing column.

Furthermore, the reaction that takes place in the absorption zone of the purification device can also be influenced by the flow of the flue gas through the absorption zone. The longer the flue gas namely resides in the absorption zone and the more uniform the flue gas flow through the absorption zone is, the better is the precipitation of sulphur oxides and accordingly the reaction to calcium sulphate.

In this context, DE-A-100 58 548 describes a scrubbing column for a flue gas purification device, in which the flue gas is supplied to the absorption zone via two flue gas inlets, which are placed on the same level in opposing shell sections of the scrubbing column, and which debouch into the absorption zone with an approximately tangential orientation in same direction. Herein, the two flue gas inlets have end sections that project into the cylindric interior of the scrubbing column and protect the flue gas inlets from an annular gas flow in the receptacle. A pipe for the flue gas supply having a separate flue gas channel, electric filter and fan is connected to each flue gas inlet. In full load operation of the boiler firing system, the flue gas is supplied to the scrubbing column via both supply pipes. In partial load operation only one of the two supply pipes can be activated. Both in full load operation and in partial load operation, a circulation flow of the flue gas is obtained in the lower part of the absorption zone, which circulation flow is slowed down towards the upper part of the absorption zone by means of irrigation with scrubbing liquid and changes into a vertical flue gas flow. Due to this flue gas supply and the flue gas flow inside the absorption zone, which is achieved in this way, the precipitation of sulphur dioxide and thus the purification process is improved. However, a disadvantage is the very complicate structure of the flue gas supply and the non-uniform flow inside the absorption zone.

It is thus an object of the present invention to provide a device and a method for flue gas purification, which overcomes the above described drawbacks.

According to the present invention, this aim is achieved by a device for flue gas purification according to claim 1 and by a method for flue gas purification according to claim 7.

According to the present invention, the flue gas purification device comprises a receptacle, which has an absorption zone, through which the supplied flue gas can flow in an essentially horizontal direction. In contrast to DE-A-100 58 548, the flue gas is thus not introduced into a lower part of the lateral zone of the absorption zone and does not flow then spirally upwards, i.e. essentially in a vertical direction, to the upper section of the absorption zone, where it leaves the scrubbing column at the upper side thereof, but it flows substantially in a horizontal direction through the absorption zone, i.e. it enters the absorption zone on one side and leaves this one on the other side. The advantage of the substantially horizontal flow through the absorption zone is that a very uniform current can be realized here, which in turn permits an improved sulphur oxide precipitation in the absorption zone. Furthermore, a complicate and expensive flue gas supply can be omitted.

According to a preferred embodiment of the present invention, the flue gas inlet and flue gas outlet of the absorption zone are opposing each other, in order to realize a flue gas flow in the absorption zone, which is as uniform as possible.

Furthermore, a parallelepiped form of the receptacle is preferred, since devices, such as for example scrubbing liquid nozzles, oxidation devices or the like, normally can be more easily fixed on flat surfaces than on curved surfaces.

Furthermore it is preferred that the device according to the invention comprises a pump device, which pumps the scrubbing liquid from the scrubbing liquid sump to the scrubbing liquid nozzles, whereby a circular movement of the scrubbing liquid is generated in the device. Due to this circulation of the scrubbing liquid it is assured that the scrubbing liquid passes several times through the absorption zone of the device, in which the flue gas purification takes place. Thereby it is assured that at least a big portion of the additives present in the scrubbing liquid reacts with the sulphur oxides present in the flue gas, such that a scrubbing liquid having a low additive concentration is collected in the scrubbing sump. This is advantageous with respect to winning calcium sulphate.

According to a preferred embodiment, the device further comprises a scrubbing liquid analyzer, by means of which the scrubbing liquid can be analyzed with respect to the composition, the pH value or the like thereof. On the base of a scrubbing liquid analytical finding obtained in such a way, it is for example possible to determine the moment, when scrubbing liquid shall be extracted from the scrubbing liquid sump for winning calcium sulphate, namely when this one contains scrubbing liquid having the desired composition or the like. The scrubbing liquid analyzer preferably works continuously, in order to always deliver actual results.

Based upon the analytical finding of the scrubbing liquid, the moment can furthermore be determined when which kind of additive shall be added to the scrubbing liquid in which amount or concentration.

Finally it is advantageous that at least one side of the receptacle has a form such that the volume of the absorption zone increases or decreases from a flue gas inlet towards a flue gas outlet, so that the flue gas flowing through the absorption zone is correspondingly slowed down or accelerated, which in turn has a corresponding effect on the residence time of the flue gas in the absorption zone. The at least one side of the receptacle can be for example the upper side, one or more side walls or a corresponding combination thereof.

In the following, the invention is described in detail with reference to the drawing. In the drawing.

BRIEF DESCRIPTION OF THE DRAWINGS

Figure 1:
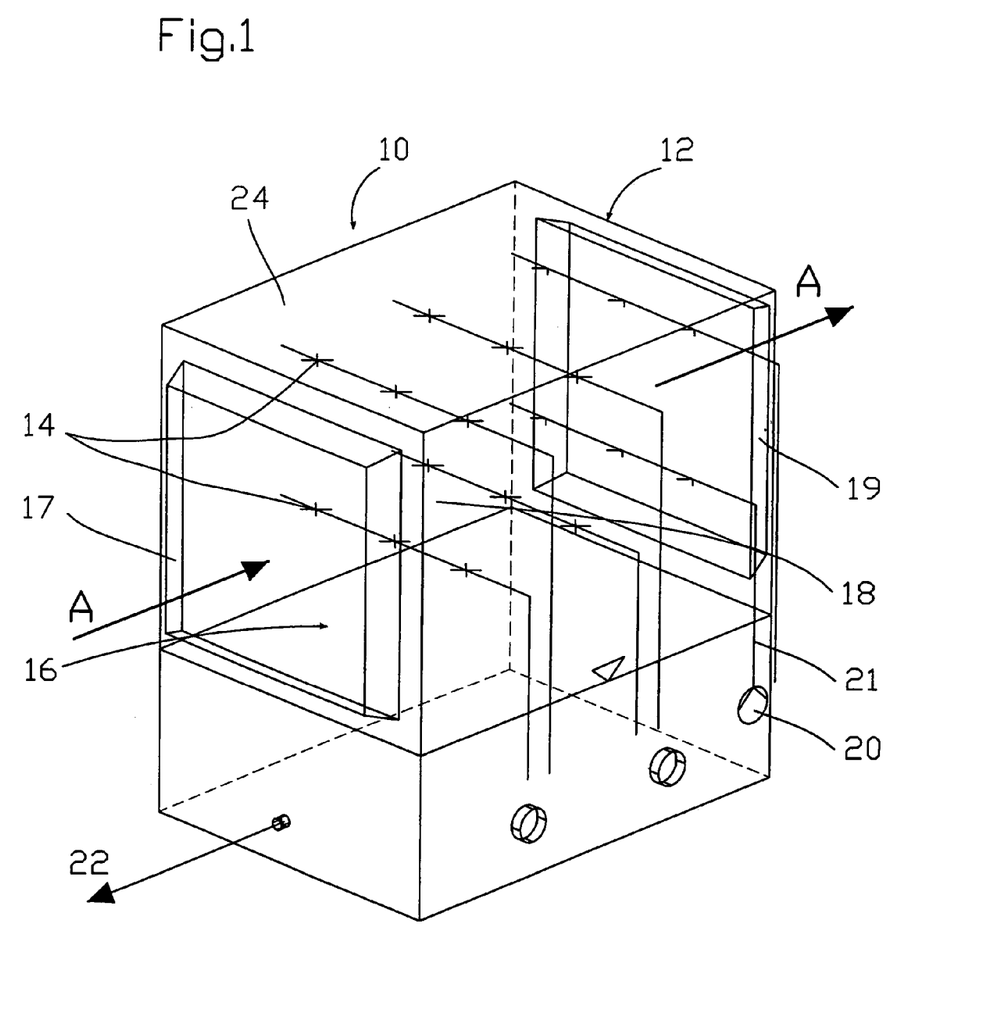
FIG. 1 is a perspective view of a first embodiment of the flue gas purification device according to present invention.

FIG. 1 shows a perspective view of a first embodiment of the flue gas purification device 10 according to the invention, wherein the walls of device 10 are represented as "transparent" for a better view, such that the components inside device 10 are visible. Besides, this is the same for the devices represented in FIGS. 2 through 6. The flue gas is preferably a flue gas of a coal power station or the like. Device 10 comprises a receptacle 12, which preferably has a parallelepiped form. In an upper section of receptacle 12, scrubbing liquid nozzles 14 are arranged, which can be placed on different levels and be oriented in different directions, e.g. horizontally or vertically, wherein a horizontal orientation of the scrubbing liquid nozzles 14 is preferred. In the lower section of receptacle 12, a scrubbing liquid sump 16 for receiving scrubbing liquid is provided. Between said scrubbing liquid nozzles 14 and said scrubbing liquid sump 16, receptacle 12 comprises an absorption zone 18, into which, in the operating state of device 10, flue gas to be purified is essentially introduced horizontally and with substantially constant speed in the direction of the arrows A via inlet 17 and flows out through outlet 19. Scrubbing liquid is pumped by means of a pump device 20 via a pipe 21 to said scrubbing liquid nozzles 14 and is atomized by these ones in form of a fine mist onto the flue gas flowing through said absorption zone 18. The alkaline earths contained in the scrubbing liquid, such as for example calcium carbonate, react with the sulphur oxides in the flue gas, whereby calcium sulphite is essentially formed, which in turn is bound in the scrubbing liquid. In this way, the flue gas flowing through said absorption zone 18 is purified. The essentially horizontal flow of the flue gas through said absorption zone 18 has the advantage that a very uniform flow can be achieved, which in turn enables an improved sulphur oxide precipitation in said absorption zone 18.

The scrubbing liquid, which leaves said absorption zone 18 and which contains the calcium sulphites, congregates in said scrubbing liquid sump 16. There, it is analysed by means of a non represented scrubbing liquid analyser, i.e. the scrubbing liquid composition and/or the pH value of the scrubbing liquid is determined.

If the parameters of the scrubbing liquid contained in said scrubbing liquid sump 16, which have been determined by means of the non represented analyser, coincide with desired scrubbing liquid parameters for winning the calcium sulphate, scrubbing liquid is extracted from said scrubbing liquid sump 16. Pipe 22, even if not represented, comprises the means required for the extraction of scrubbing liquid, such as e.g. valves, pumps or the like.

An oxidation device is preferably provided in said scrubbing liquid sump 16, in order to oxidize the undesirable calcium sulphites, which are present there, to calcium sulphate. This oxidation device, which is not represented here, can be for example an oxygen supply in form of air, wherein the air is preferably horizontally supplied through corresponding air outlets to said scrubbing liquid sump 16.

Figure 2:
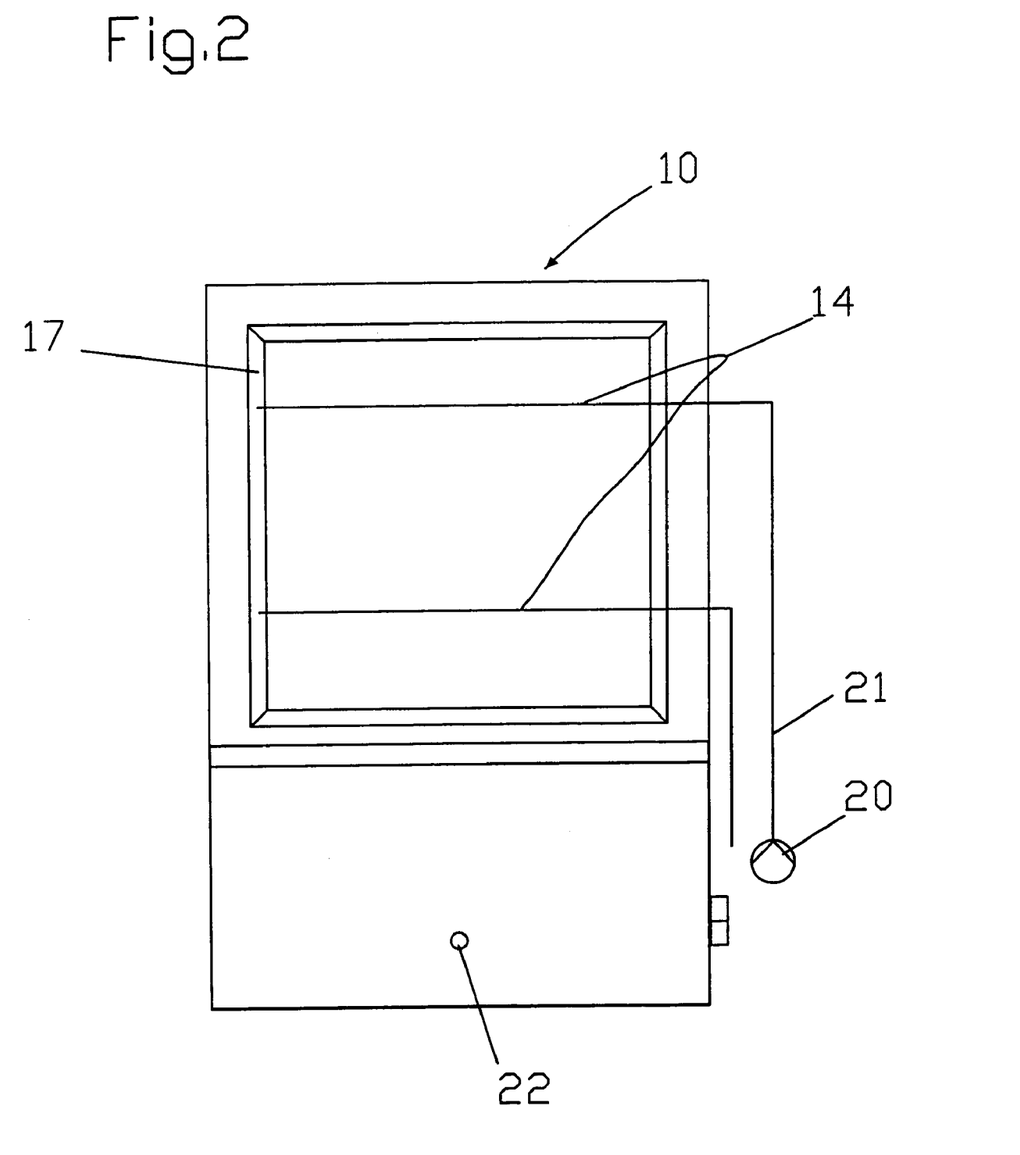
FIG. 2 is a side view of the first embodiment represented in FIG. 1.

FIG. 2 shows a side view of the first embodiment of the flue gas purification device according to the present invention, which is represented in FIG. 1. In this figure one can observe that the scrubbing liquid nozzles 14 are arranged on different levels.

Figure 3:
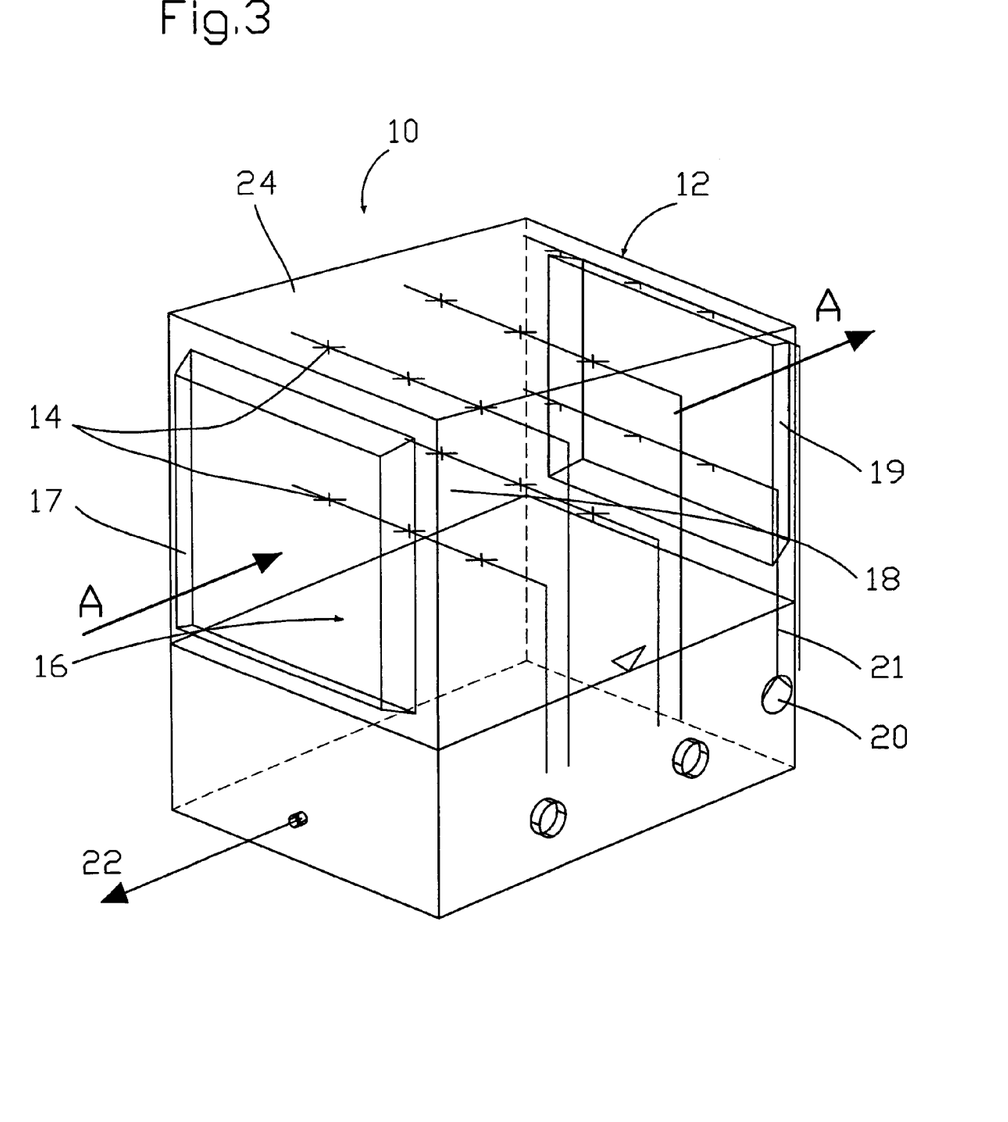
FIG. 3 is a perspective view of a second embodiment of the flue gas purification device according to present invention.

FIG. 3 is a perspective view of another embodiment of the flue gas purification device according to the present invention. Device 10 represented in FIG. 3 essentially differs from device 10 represented in FIGS. 1 and 2 in that the upper side 24 is angled inwards in such a way that the volume of absorption zone 18 becomes smaller from the flue gas inlet 17 towards the flue gas outlet 19. In this exemplary embodiment, the flue gas inlet 17 is also larger than the flue gas outlet 19. Due to this form of receptacle 12 as well as of flue gas inlet and flue gas outlet 17 and 19, the flue gas flowing through absorption zone 18 is accelerated in receptacle 12, such that the velocity of the flue gas increases and thus the residence time in receptacle 12 and thus in absorption zone 18 is shortened.

Figure 4:
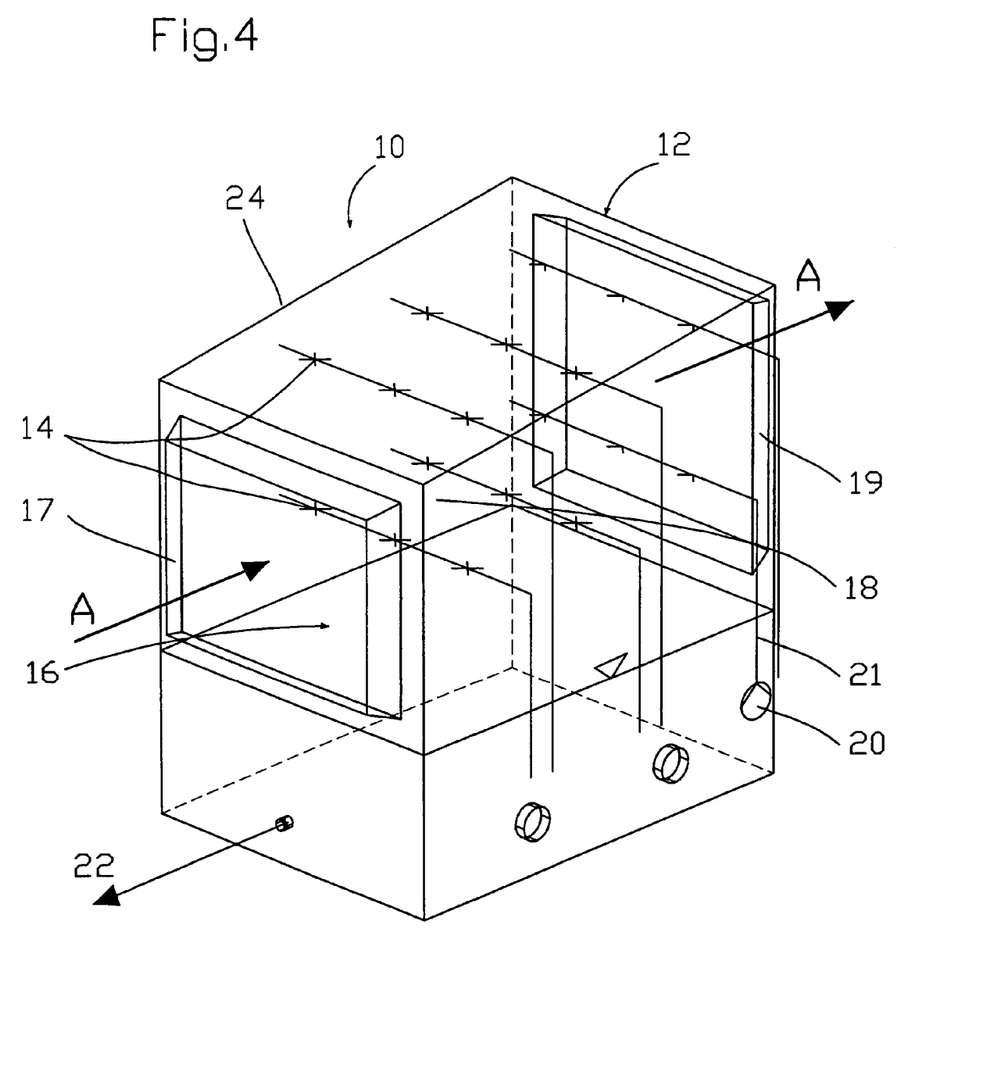
FIG. 4 is a perspective view of a third embodiment of the flue gas purification device according to present invention.

FIG. 4 shows still another embodiment of the device for flue gas purification according to the present invention. In contrast to the device represented in FIG. 3, the upper side 24 of receptacle 12 is angled outwards in such a way that the volume of absorption zone 18 increases from flue gas inlet 17 towards flue gas outlet 19, wherein flue gas inlet 17 is correspondingly smaller than flue gas outlet 19. In this way, the flue gas is relieved on its way through absorption zone 18 of receptacle 12 from flue gas inlet 17 towards flue gas outlet 19, so that the velocity thereof decreases and thus the residence time thereof in absorption zone 18 is prolonged.

Figure 5:
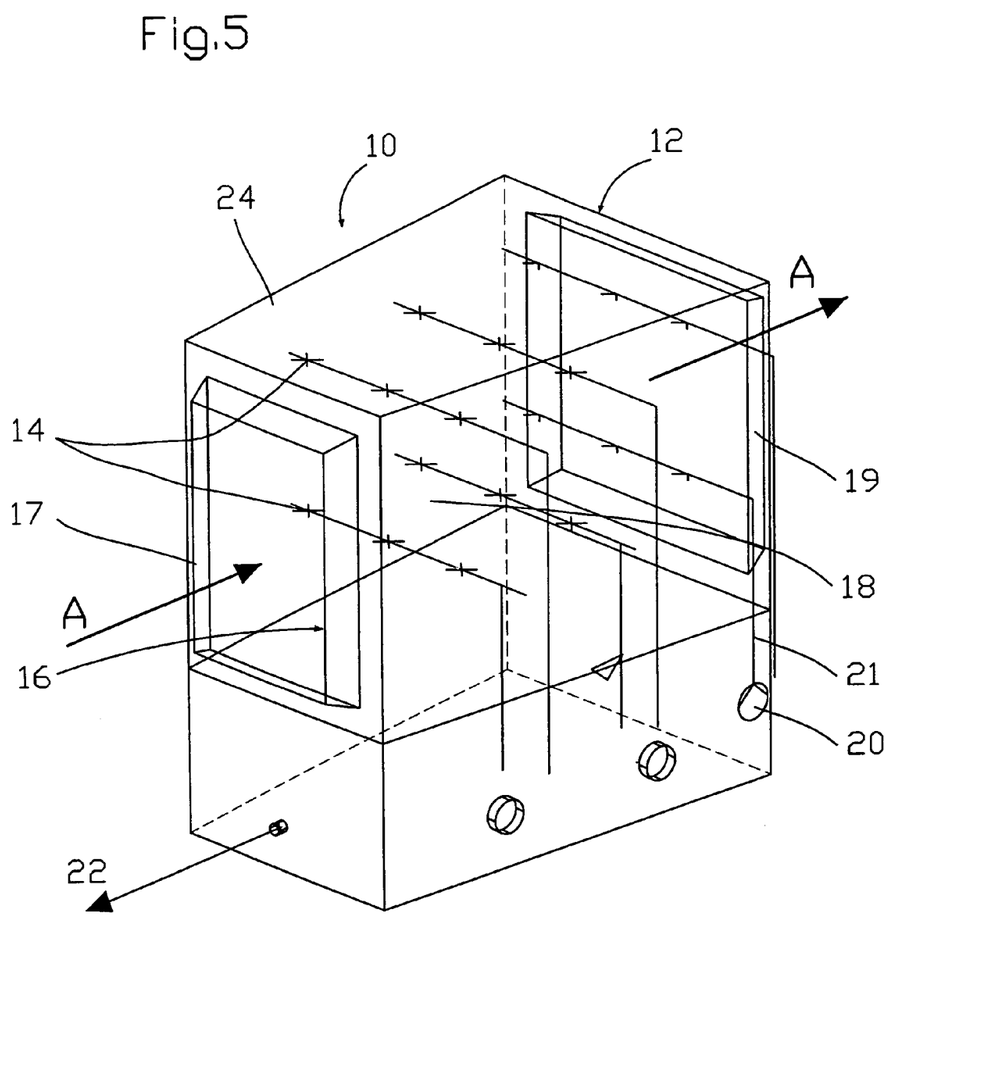
FIG. 5 is a perspective view of a fourth embodiment of the flue gas purification device according to present invention and FIG. 6 is a perspective view of a fifth embodiment of the flue gas purification device according to present invention.

FIG. 5 is a perspective view of a fourth embodiment of the device for flue gas purification according to the present invention. This embodiment essentially corresponds to the third embodiment represented in FIG. 4, such that according to FIG. 5, the side walls of receptacle 12 instead of said upper side 24 of receptacle 12 are angled outwards in such a way that the volume of the absorption zone increases from flue gas inlet 17 towards flue gas outlet 19.

Figure 6:
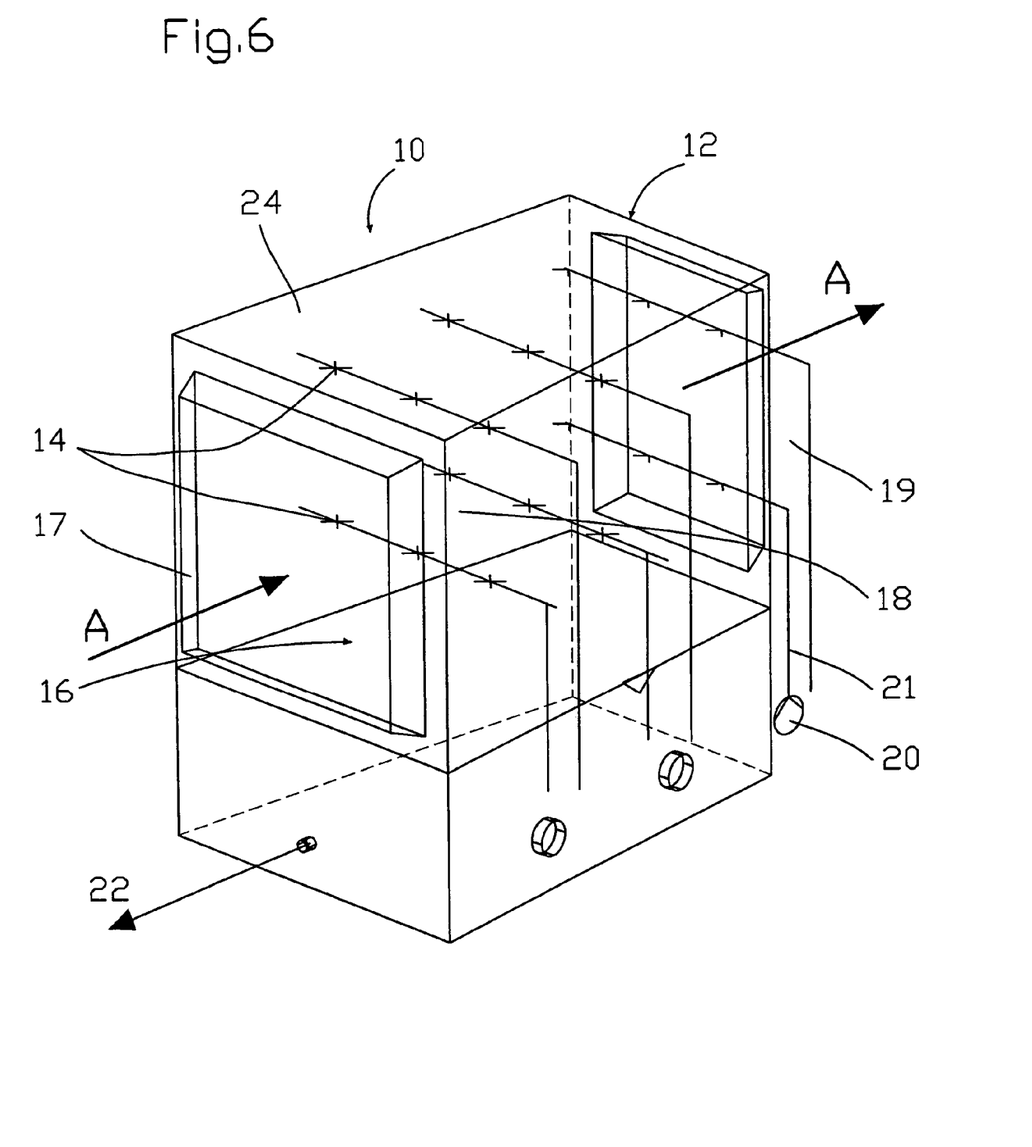

FIG. 6 finally is a perspective view of a fifth embodiment of the device for flue gas purification according to the present invention, which is essentially similar to the embodiment represented in FIG. 3, apart from the fact that the side walls of receptacle 12 instead of the upper side 24 of receptacle 12 are angled inwards in such a way that the volume of absorption zone 18 decreases from flue gas inlet 17 towards flue gas outlet 19.

The embodiments of the device according to the invention, which are represented in FIGS. 1 through 6, comprise each an oxidation device in the scrubbing liquid sump, which oxidation device is not represented in the figures to simplify matters. By means of this oxidation device, oxygen is introduced into the scrubbing liquid sump, which reacts with calcium sulphites to calcium sulphate.

Furthermore, the device according to the invention and the method according to the invention can also be used for example for desalinization, in the cement industry or generally in power stations, which make use of fossil fuels.

It is to be understood that the above described preferred embodiments are not limiting, and thus other modifications and changes are possible without leaving the protected scope of the present invention defined by the annexed claims.

LIST OF REFERENCE NUMERALS

10 device
12 receptacle
14 scrubbing liquid nozzles
16 scrubbing liquid sump
17 inlet
18 absorption zone
19 outlet
20 pump device
21 pipe
22 pipe
24 upper side

The invention claimed is:

1. A flue gas purification device comprising
a receptacle, an absorption zone, said absorption zone having a flue gas inlet, a flue gas outlet, a scrubbing liquid sump, and scrubbing liquid nozzles,
wherein supplied flue gas can flow in an essentially horizontal direction through said absorption zone;
wherein said scrubbing liquid sump is provided in a lower section of said receptacle and said scrubbing liquid nozzles are arranged in an upper section of said receptacle above said scrubbing liquid sump; and
wherein said absorption zone is between said scrubbing liquid nozzles and said scrubbing liquid sump;
wherein said receptacle is substantially a parallelepiped.

2. The device according to claim 1, which further comprises a pump device.

3. The device according to claim 1, which further comprises a scrubbing liquid analyser.

4. The device according to claim 3, wherein said scrubbing liquid analyser continuously analyses scrubbing liquid samples.

5. The device according to claim 1, wherein at least one side of said receptacle is formed such that the volume of said absorption zone increases or decreases from a flue gas inlet towards a flue gas outlet.

6. A method for flue gas purification, comprising
using the device according to claim 1;
guiding flue gas through the receptacle having an absorption zone in an essentially horizontal direction;
providing said absorption zone between scrubbing liquid nozzles in an upper section of said receptacle and a scrubbing liquid sump in a lower section of said receptacle;
atomizing scrubbing liquid by said scrubbing liquid nozzles in the upper section of said absorption zone towards said scrubbing liquid sump;
adding additives to the scrubbing liquid based on a result of a scrubbing liquid analysis.

7. The method according to claim 6, further comprising pumping the scrubbing liquid from said scrubbing liquid sump to said scrubbing liquid nozzles.

8. The method according to claim 6, further comprising extracting the scrubbing liquid from said scrubbing liquid sump based on a result of a scrubbing liquid analysis.

9. The method according to claim 6, further comprising accelerating or slowing down the flue gas guided through said absorption area of said receptacle.

* * * * *